(12) United States Patent
Aizawa et al.

(10) Patent No.: US 11,370,180 B2
(45) Date of Patent: Jun. 28, 2022

(54) ULTRASONIC BONDING APPARATUS, CONTROL DEVICE AND CONTROL METHOD

(71) Applicant: KABUSHIKI KAISHA TOSHIBA, Tokyo (JP)

(72) Inventors: Takahiro Aizawa, Yokohama (JP); Takashi Ito, Fujisawa (JP); Masatoshi Tanabe, Yokohama (JP); Haruka Yamamoto, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/351,746

(22) Filed: Jun. 18, 2021

(65) Prior Publication Data

US 2022/0105693 A1 Apr. 7, 2022

(30) Foreign Application Priority Data

Oct. 7, 2020 (JP) .............................. JP2020-169683

(51) Int. Cl.
- *B32B 41/00* (2006.01)
- *B29C 65/00* (2006.01)
- *B29C 65/08* (2006.01)

(52) U.S. Cl.
CPC .......... *B29C 66/9241* (2013.01); *B29C 65/08* (2013.01); *B29C 66/9511* (2013.01)

(58) Field of Classification Search
CPC .. B29C 66/9241; B29C 66/9511; B29C 65/08
USPC .................... 156/60, 64, 350, 351, 378, 379
See application file for complete search history.

(56) References Cited

U.S. PATENT DOCUMENTS

| | | | | |
|---|---|---|---|---|
| 5,431,324 A | * | 7/1995 | Kajiwara | B23K 20/10 228/1.1 |
| 6,827,247 B1 | * | 12/2004 | Fan | B23K 20/10 228/103 |
| 2006/0113350 A1 | | 6/2006 | Ozaki et al. | |

FOREIGN PATENT DOCUMENTS

| | | |
|---|---|---|
| JP | 2-250261 A | 10/1990 |
| JP | 10-69829 A | 3/1998 |
| JP | 2005-142537 A | 6/2005 |
| JP | 2005-294824 A | 10/2005 |
| JP | 2006-156755 A | 6/2006 |
| JP | 2020-66042 A | 4/2020 |

* cited by examiner

*Primary Examiner* — Michael N Orlando
*Assistant Examiner* — Joshel Rivera
(74) *Attorney, Agent, or Firm* — Oblon, McClelland, Maier & Neustadt, L.L.P.

(57) ABSTRACT

An ultrasonic bonding apparatus includes a sensor that detects vibration along a height direction in a bonding target member which vibrates by ultrasonic vibration. The ultrasonic bonding apparatus includes a control device that changes control parameters associated with the driving of a bonding tool based on information related to the vibration along the height direction detected by the sensor.

5 Claims, 6 Drawing Sheets

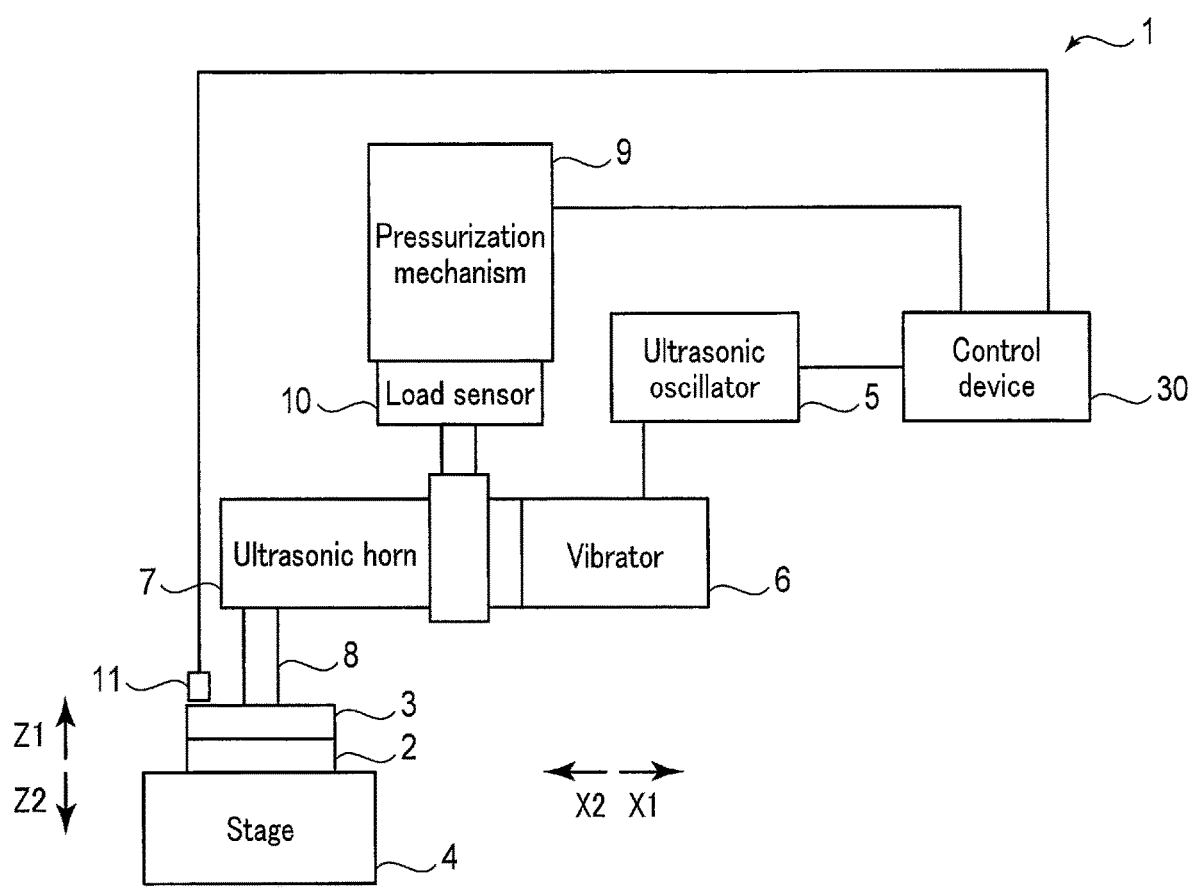
F I G. 1

ULTRASONIC BONDING APPARATUS, CONTROL DEVICE AND CONTROL METHOD

CROSS-REFERENCE TO RELATED APPLICATIONS

This application is based upon and claims the benefit of priority from Japanese Patent Application No. 2020-169683, filed Oct. 7, 2020; the entire contents of which are incorporated herein by reference.

FIELD

Embodiments described herein relate generally to an ultrasonic bonding apparatus, a control device, and a control method.

BACKGROUND

In ultrasonic bonding, a bonding target member is arranged between a stage and a bonding tool, and ultrasonic vibration is transmitted from the bonding tool to the bonding target member in a state where the bonding tool presses the bonding target member, thereby bonding the bonding target member. Ultrasonic bonding requires that even if, for example, the bonding target members used vary in shape, the bonding strength of the bonding target members does not decrease in bonding by ultrasonic bonding.

BRIEF DESCRIPTION OF THE DRAWINGS

FIG. 1 is a schematic diagram showing an example of an ultrasonic bonding apparatus according to a first embodiment.

DETAILED DESCRIPTION

Figure 2:
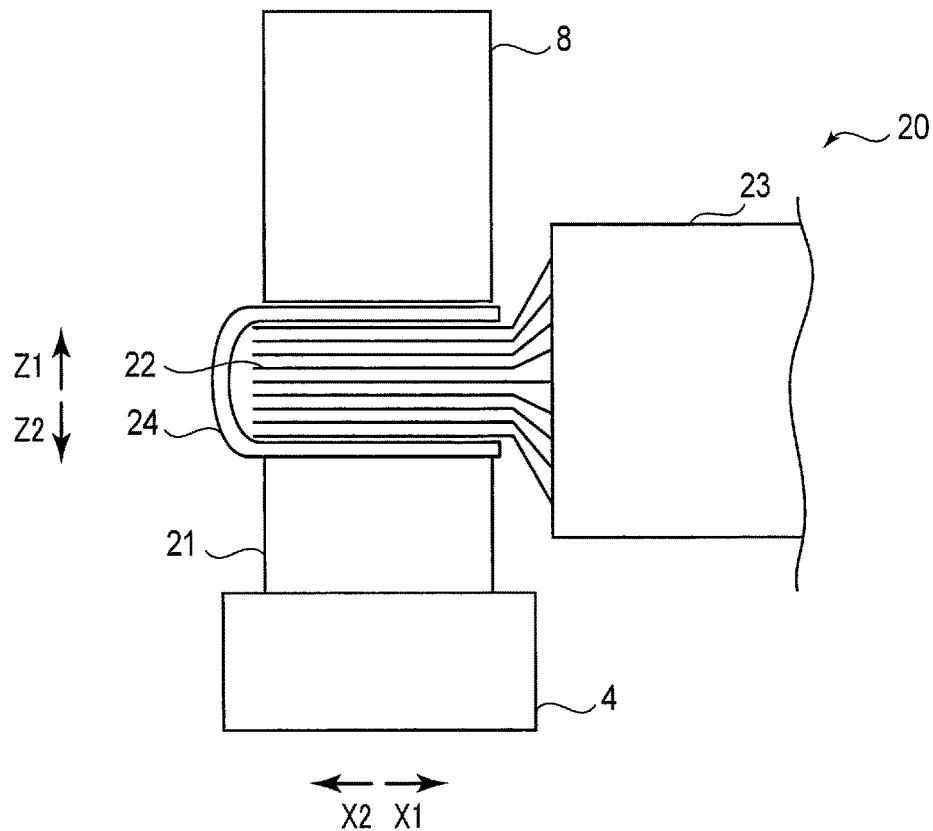
FIG. 2 is a schematic diagram showing an example of bonding target members to be ultrasonically bonded by the ultrasonic bonding apparatus according to the first embodiment.

According to an embodiment, an ultrasonic bonding apparatus includes a stage, a bonding tool, a sensor, and a control device. On an upper side of the stage in a height direction, a bonding target member can be arranged. The bonding tool, arranged above the bonding target member in the height direction, through being driven in a state of using pressurizing force to press the bonding target member downward in the height direction while transmitting ultrasonic vibration which vibrates in a direction intersecting this height direction to the bonding target member, thereby bonds the target member. The sensor detects vibration along the height direction in the bonding target member which vibrates by the ultrasonic vibration. The control device changes control parameters associated with the driving of the bonding tool based on information related to the vibration along the height direction detected by the sensor.

Hereinafter, embodiments will be described with reference to the drawings.

First Embodiment

FIG. 1 shows an example of an ultrasonic bonding apparatus according to an embodiment. As shown in FIG. 1, in an ultrasonic bonding apparatus 1, a height direction (direction indicated by arrows Z1 and Z2), a first direction (direction indicated by arrows X1 and X2) intersecting (perpendicular or approximately perpendicular to) the height direction, and a second direction intersecting (perpendicular or approximately perpendicular to) both the height direction and the first direction, are defined. In one example, the height direction coincides or approximately coincides with a vertical direction. In this case, the first direction coincides or approximately coincides with a first horizontal direction intersecting (perpendicular or approximately perpendicular to) the vertical direction, and the second direction coincides or approximately coincides with a second horizontal direction intersecting (perpendicular or approximately perpendicular to) both the vertical direction and the first horizontal direction.

In the ultrasonic bonding apparatus 1, bonding target members 2 and 3 can be arranged on an upper surface of a stage 4 in the height direction. The stage 4 supports the bonding target members 2 and 3 from a lower side in the height direction. In a case where the bonding target members 2 and 3 are ultrasonically bonded using the ultrasonic bonding apparatus 1, the bonding target members 2 and 3 are arranged in a state of overlap on the upper surface of the stage 4.

An ultrasonic oscillator 5 converts an input electric signal into an electric signal of high frequency (e.g., 20 kHz or 40 kHz) and high voltage (e.g., about 1000 V), and transmits the converted electric signal to a vibrator 6. The vibrator 6 converts the electric signal transmitted from the ultrasonic oscillator 5 into vibration to generate ultrasonic waves. The vibration generated from the vibrator 6 is transmitted to an ultrasonic horn 7. The ultrasonic horn 7 transmits the ultrasonic vibration transmitted from the vibrator 6 to a bonding tool 8. The bonding tool 8 transmits the ultrasonic vibration transmitted from the ultrasonic horn 7 to the bonding target members 2 and 3. In the present embodiment, the bonding tool 8 vibrates in the first direction. A pressurization mechanism 9 applies pressurizing force to the ultrasonic horn 7 and the bonding tool 8, pressing the bonding tool 8 against the bonding target members 2 and 3. Thereby, the bonding target members 2 and 3 vibrate in the first direction and are bonded.

A vibration transmission direction of vibration from the bonding tool 8 to the bonding target members 2 and 3 is perpendicular or approximately perpendicular to a vibration direction of the bonding tool 8. With the configuration as described above, the bonding tool 8 is driven in a state of using pressurizing force to press the bonding target members 2 and 3 downward in the height direction and transmitting ultrasonic vibration which vibrates in the first direction intersecting the height direction to the bonding target members 2 and 3. Then, when the bonding tool 8 is driven, the bonding target members 2 and 3 are bonded. The ultrasonic vibration which vibrates in the first direction is transmitted from the bonding tool 8 to the bonding target members 2 and 3, but depending on the shape, etc. of the bonding target members 2 and 3, vibration in a direction different from the first direction, such as vibration along the height direction, can be generated in the bonding target members 2 and 3. The vibration along the height direction is vibration in which a transmission direction and a vibration direction of the vibration either coincide or approximately coincide with each other.

A control device 30 controls the ultrasonic oscillator 5 and the pressurization mechanism 9. In addition, a load sensor 10 and a sensor 11 are connected to the control device 30. In the present embodiment, the load sensor 10 measures pressurizing force applied to the ultrasonic horn 7 and the bonding tool 8 from the pressurization mechanism 9 as a measurement parameter. The sensor 11 detects information related to vibration along the height direction of the bonding target members 2 and 3. In the present embodiment, the sensor 11 measures vibration amplitude along the height direction and/or displacement as a measurement parameter. In the load sensor 10 and the sensor 11, the above-described measurement parameter, etc. is detected periodically at a predetermined timing. In the present embodiment, the sensor 11 is arranged above the bonding target members 2 and 3 in the height direction.

In one example, the sensor 11 is an eddy current displacement sensor. The eddy current displacement sensor is used in a case where an object to be measured (the bonding target members 2 and 3 in the present embodiment) by a sensor is a conductive material. The conductive material is, for example, a metal. In the eddy current displacement sensor, a high-frequency magnetic field is generated by a coil inside the sensor. When an object to be measured is present within this high-frequency magnetic field, an eddy current is generated in the object to be measured by an electromagnetic induction effect. The eddy current displacement sensor measures a distance between the sensor and the object by utilizing a change in impedance of a coil caused by this eddy current. In the ultrasonic bonding apparatus 1 according to the present embodiment, the eddy current displacement sensor is installed along the height direction. That is, the eddy current displacement sensor is installed perpendicularly or approximately perpendicularly to surfaces (bonded surfaces) of the bonding target members 2 and 3 contacting each other in the height direction. Thereby, it is possible to detect vibration in a direction in which the eddy current displacement sensor and the bonding target members 2 and 3 are either close or separate, i.e., vibration which vibrates in a direction (the height direction) perpendicular or approximately perpendicular to the bonded surfaces.

In another example, the sensor 11 is a laser displacement sensor. The laser displacement sensor emits a laser beam from a sensor head to an object to be measured, and receives light reflected from the object by the sensor head. The laser displacement sensor measures a distance of the object to be measured with respect to the sensor head based on a change in state of the reflected light and/or a change in time from irradiation to reception of the laser beam. In the ultrasonic bonding apparatus 1 according to the present embodiment, the laser displacement sensor is installed along the height direction. That is, the laser displacement sensor is installed in a state where the laser beam emitted from the sensor head is perpendicular or approximately perpendicular to the bonded surfaces of the bonding target members 2 and 3. Thereby, it is possible to detect vibration in a direction in which the laser displacement sensor and the bonding target members 2 and 3 are either close or separate, i.e., vibration which vibrates in a direction (the height direction) perpendicular or approximately perpendicular to the bonded surfaces.

Each of the vibrator 6, the ultrasonic horn 7, and the bonding tool 8 may be formed separately; the vibrator 6 and the ultrasonic horn 7 may be formed integrally; or the ultrasonic horn 7 and the bonding tool 8 may be formed integrally. In addition, each of the vibrator 6, the ultrasonic horn 7, and the bonding tool 8 may be formed integrally.

In a case where the bonding target members 2 and 3 are ultrasonically bonded using the ultrasonic bonding apparatus 1, the bonding tool 8 transmits ultrasonic vibration to the bonding target members 2 and 3 in addition to pressing the bonding target member 3 against the bonding target member 2 via the pressurizing force of the pressurization mechanism 9. The bonding target members 2 and 3 are thereby ultrasonically bonded. In one example shown in FIG. 2, the ultrasonic bonding apparatus 1 is used for bonding of a lead 21 of a battery 20. In the battery 20, current collecting tabs 22 protrude from an electrode group 23. A clip plate 24 sandwiches a plurality of current collecting tabs 22 therebetween. In a case where the clip plate 24, current collecting tabs 22, and lead 21 are ultrasonically bonded using the ultrasonic bonding apparatus 1, the bonding tool 8 transmits ultrasonic vibration to the clip plate 24, current collecting tabs 22, and lead 21 in addition to pressing the clip plate 24 against the lead 21 via the pressurizing force of the pressurization mechanism 9. Thereby, the clip plate 24, current collecting tabs 22, and lead 21 are ultrasonically bonded. In FIG. 2, a direction in which the current collecting tabs 22 protrude from the electrode group 23 coincides with the first direction, but is not limited thereto. For example, the direction in which the current collecting tabs 22 protrude from the electrode group 23 may coincide with the second direction.

In the ultrasonic bonding apparatus 1 of the present embodiment, a user interface may be provided. The user interface includes an operating member. In the operating member, an instruction associated with operations of the ultrasonic bonding apparatus 1 is input by an operator, etc. Examples of the operating member include a button, a dial, a display, and a touch panel. In addition, the user interface may include a notification part that notifies information to the operator, etc. The notification part performs notification by means of a screen display, issuing of sound, lighting-up of a light, etc. In the notification part, for example, information necessary for recognition by the operator, warning information for the operator, etc. is notified.

Figure 3:
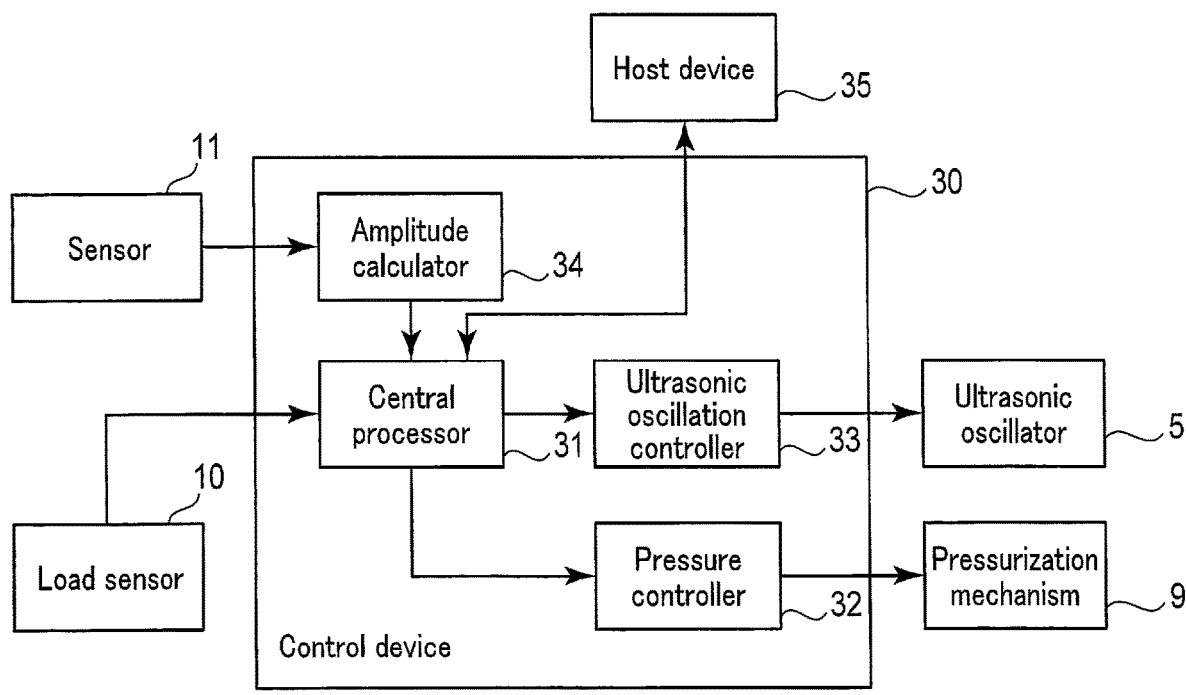
FIG. 3 is a block diagram schematically showing an example of the ultrasonic bonding apparatuses according to the first embodiment.

FIG. 3 shows an example of a block diagram of the control device 30. The control device 30 is, for example, a computer. The control device 30 includes a processor or an integrated circuit (control circuit) including a central processing unit (CPU), an application specific integrated circuit (ASIC), or a field programmable gate array (FPGA), and a storage medium such as a memory. The control device 30 may include one processor or integrated circuit, or a plurality of processors or integrated circuits. The control device 30 performs processing by executing a program, etc. stored in the storage medium, etc.

The control device 30 includes a central processor 31, a pressure controller 32, an ultrasonic oscillation controller 33, and an amplitude calculator 34. The central processor 31 manages the control device 30. The pressure controller 32 controls the pressurization mechanism 9 to adjust a magnitude of pressurizing force applied from the pressurization mechanism 9 to the bonding target members 2 and 3. The ultrasonic oscillation controller 33 controls ultrasonic oscillation of the ultrasonic oscillator 5. The amplitude calculator 34 calculates vibration amplitude along the height direction of the bonding target members 2 and 3 based on a measurement value of the sensor 11. The central processor 31 acquires from the load sensor 10 load applied by the pressurization mechanism 9. The central processor 31 can control the pressurization mechanism 9 and the ultrasonic oscillator 5 via the pressure controller 32 and the ultrasonic oscillation controller 33 based on information acquired from the load sensor 10 and the amplitude calculator 34. In addition, the central processor 31 can communicate with an external host device 35, and receive a control instruction from the host device 35. The central processor 31 can transmit information related to the ultrasonic bonding apparatus 1 to the host device 35 based on a request from the external host device 35. The host device 35 is, for example, a control device that controls an entire facility for manufacturing batteries.

In the above-described ultrasonic bonding apparatus 1, the bonding tool 8 vibrates in the first direction. By being pressed by the bonding tool 8, the bonding target members 2 and 3 vibrate in the first direction and are pressed against each other, thereby ultrasonically bonded. In this case, the bonding target members 2 and 3 may not only vibrate in the first direction but also in the height direction as described above. In ultrasonic bonding using the ultrasonic bonding apparatus 1, an increase in the vibration amplitude along the height direction of the bonding target members 2 and 3 leads to a decrease in the bonding strength of these members. Thus, in the ultrasonic bonding apparatus 1, it is important that vibration amplitude along the height direction of the bonding target members 2 and 3 at the time of ultrasonic bonding is suppressed. In the present embodiment, by the control device 30 controlling the ultrasonic oscillator 5 and the pressurization mechanism 9, vibration amplitude along the height direction of the bonding target members 2 and 3 at the time of ultrasonic bonding is suppressed.

When the control device 30 controls the ultrasonic oscillator 5 and the pressurization mechanism 9, the ultrasonic bonding apparatus 1 ultrasonically bonds the bonding target members 2 and 3, and the load sensor 10 and the sensor 11 detect the above-described measurement parameters (pressurizing force, and vibration amplitude along the height direction and/or displacement). Then, the control device 30 acquires measurement values of the measurement parameters at the load sensor 10 and the sensor 11. Thus, the measurement parameters are acquired by the control device 30. The control device 30 acquires the measurement values of the measurement parameters periodically at a predetermined timing. Thus, the control device 30 also acquires, as measurement data, a temporal change (temporal history) of the measurement parameters, in addition to the measurement values of the measurement parameters. Accordingly, the measurement data acquired by the control device 30 includes a temporal change (temporal history) of pressurizing force of the pressurization mechanism 9, a temporal change (temporal history) of vibration amplitude and/or displacement along the height direction of the bonding target members 2 and 3, etc.

Figure 4:
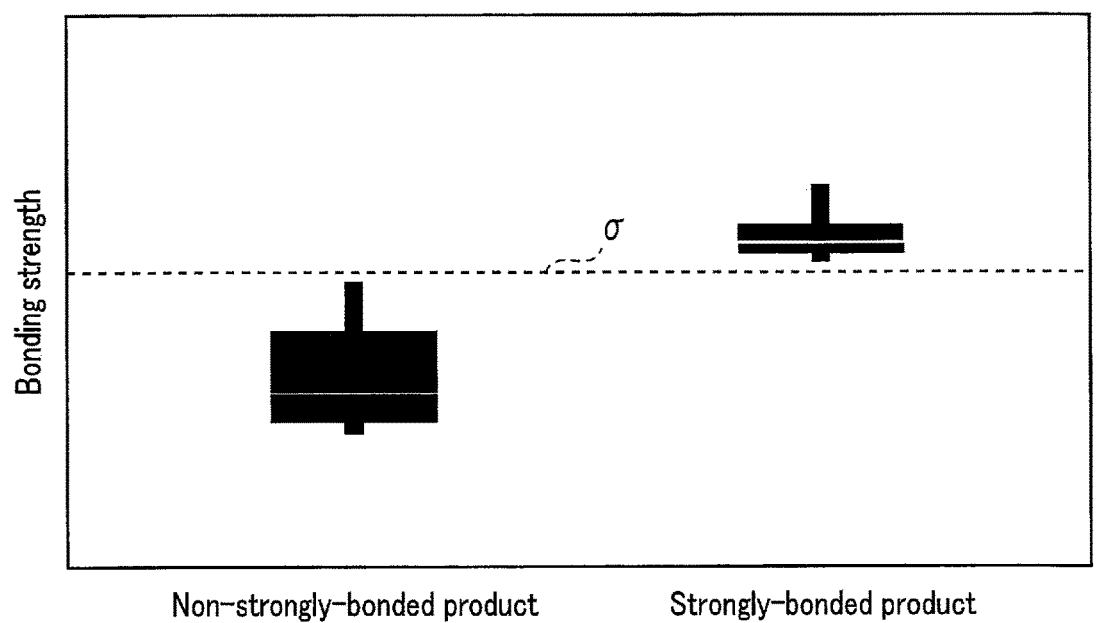
FIG. 4 is a schematic diagram showing an example of the bonding strength of both a strongly-bonded product and a non-strongly-bonded product in a case where bonding target members are ultrasonically bonded using the ultrasonic bonding apparatus according to the first embodiment.

Herein, a threshold value of vibration amplitude along the height direction of the bonding target members 2 and 3 will be described. A threshold value of vibration along the height direction of the bonding target members 2 and 3 is set based on a measurement result of measurement parameters in a strongly-bonded product on which ultrasonic bonding is satisfactorily performed. FIG. 4 is a schematic diagram showing the bonding strength of a strongly-bonded product and a non-strongly-bonded product. An ordinate axis represents bonding strength (N). A bonding strength reference value is indicated by a broken line σ. A bonding strength reference value is, for example, set as the strength of a bonded portion that satisfies required vibration resistance when using an ultrasonically bonded product. In the present embodiment, when a bonding strength exceeding the above-described bonding strength reference value is obtained by ultrasonic bonding, such a product is referred to as a "strongly-bonded product", and when a bonding strength of the above-described bonding strength reference value or less is obtained by ultrasonic bonding, such a product is referred to as a "non-strongly-bonded product".

Figure 5:
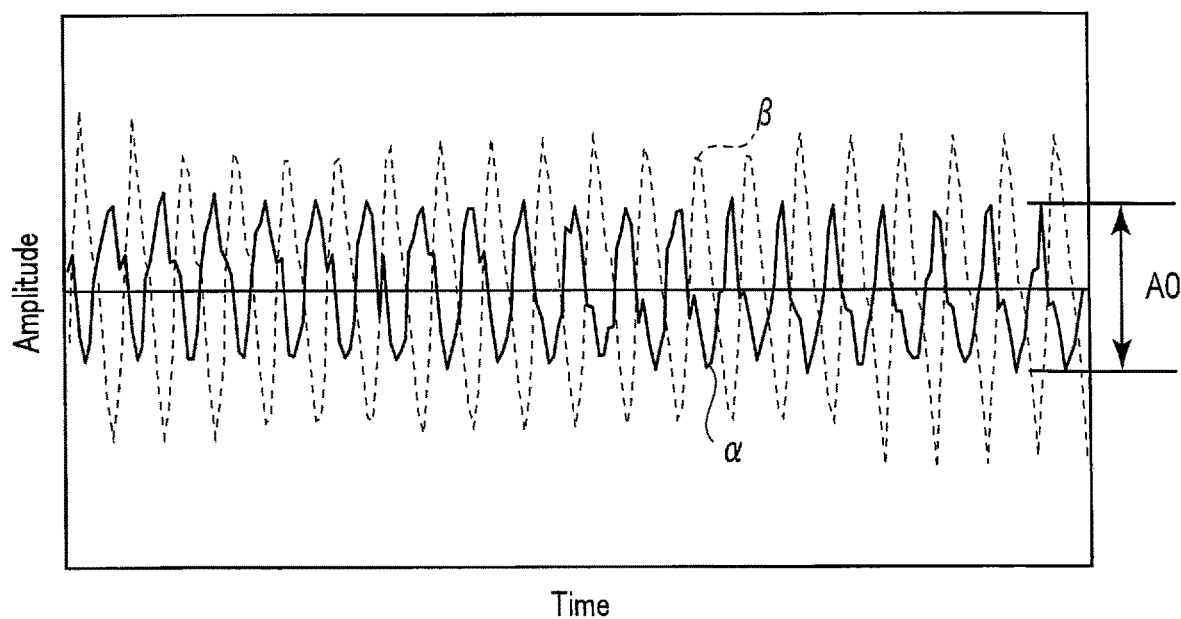
FIG. 5 is a schematic diagram showing an example of a temporal change in vibration amplitude along a height direction of bonding target members of a strongly-bonded or non-strongly-bonded product in a case where the bonding target members are ultrasonically bonded using the ultrasonic bonding apparatus according to the first embodiment.

FIG. 5 is a schematic diagram for detection by the sensor 11 of a temporal change of vibration along the height direction of the bonding target members in either a strongly-bonded or non-strongly-bonded product. An ordinate axis represents amplitude (μm), and an abscissa axis represents time (ms). As described above, the strongly-bonded product (indicated by a line α) has a smaller vibration amplitude along the height direction than that of the non-strongly-bonded product (indicated by a broken line β). A threshold value of vibration along the height direction of the bonding target members 2 and 3 is set based on amplitude A0 of vibration along the height direction of the strongly-bonded product. The amplitude A0 of vibration along the height direction of the strongly-bonded product is, for example (but not limited to) a value obtained by averaging a plurality of vibration amplitude measurement values along the height direction in the strongly-bonded product in a temporal vibration change along the height direction of the bonding target members. In the present embodiment, a first specified value A1 and a second specified value A2 are set as threshold values of vibration along the height direction of the bonding target members 2 and 3. The first specified value A1 is a reference value indicating that ultrasonic bonding is satisfactorily performed. The second specified value A2 is a reference value indicating that ultrasonic bonding is not satisfactorily performed. The second specified value A2 is greater than the first specified value A1. In one example, the first specified value A1 is a value obtained by multiplying the amplitude A0 of a strongly-bonded product by 1.5, i.e., 1.5×A0. The second specified value A2 is a value obtained by multiplying the amplitude A0 of the strongly-bonded product by 2.0, i.e., 2.0×A0. The first specified value A1 and the second specified value A2 are not limited thereto but may be other values as long as they are set based on the amplitude A0.

Figure 6:
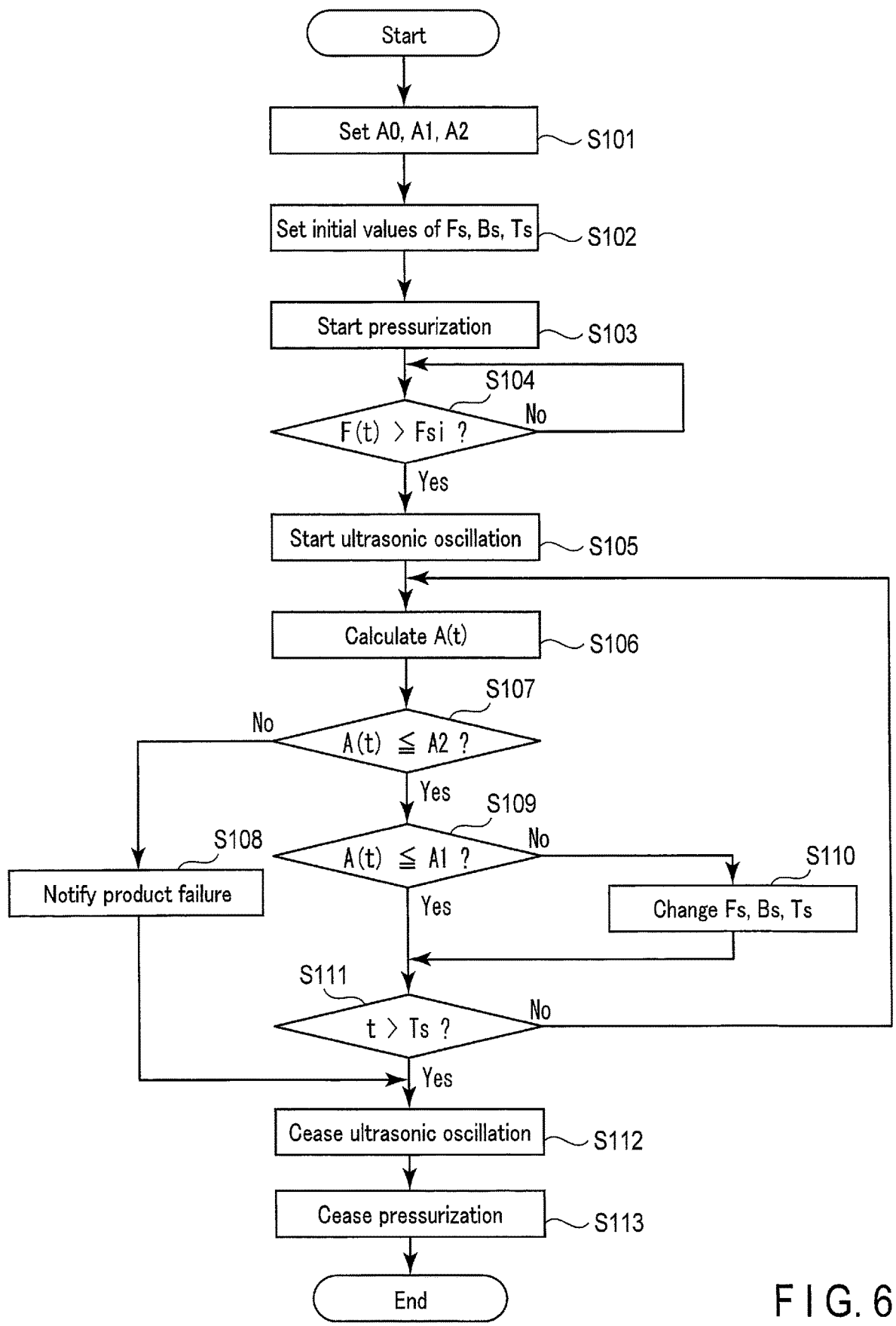
FIG. 6 is an example of a flowchart showing processing performed by a control device in the ultrasonic bonding apparatus according to the first embodiment.

FIG. 6 shows an example of processing performed by the control device when ultrasonically bonding the bonding target members in the ultrasonic bonding apparatus according to the embodiment. The processing in FIG. 6 is performed by the control device 30 every time an ultrasonic bonding work of the bonding target members 2 and 3 is performed in the ultrasonic bonding apparatus 1. Accordingly, the processing in FIG. 6 shows processing performed in single ultrasonic bonding of the control device 30. As shown in FIG. 3, in the present embodiment, the processing in FIG. 6 is performed by the central processor 31 of the control device 30. In the following descriptions, time t is defined as a variable of time. Then, pressurizing force F(t) at time t, amplitude A(t) of vibration along the height direction, and amplitude B(t) in the first direction of ultrasonic vibration are defined. In addition, in the ultrasonic bonding apparatus 1, the pressurizing force F(t) is periodically detected by the load sensor 10, and the amplitude A(t) of vibration along the height direction is periodically detected by the sensor 11. In the central processor 31, the pressurizing force F(t) and the amplitude A(t) of vibration along the height direction are acquired periodically. A time interval for detecting the pressurizing force F(t) is preferably 1 ms or less. In addition, a time interval for detecting the amplitude A(t) of vibration along the height direction is preferably one-tenth or less of one cycle of ultrasonic vibration. For example, in a case where a frequency of ultrasonic vibration is 20 kHz, a time interval for detecting the amplitude A(t) is preferably 5 μs or less. Hereinafter, a description will be given of a case where the central processor 31 adjusts oscillation of the ultrasonic oscillator 5 in cooperation with the ultrasonic oscillation controller 33, and the central processor 31 adjusts pressurization of the pressurization mechanism 9 in cooperation with the pressure controller 32. For example, the ultrasonic oscillator 5 is controlled by the ultrasonic oscillation controller 33 based on a control instruction input from the central processor 31. Then, the pressurization mechanism 9 is controlled by the pressure controller 32 based on a control instruction input from the central processor 31.

In the ultrasonic bonding apparatus 1, the bonding target members 2 and 3 are installed on the upper surface of the stage 4 in the height direction. The bonding target members 2 and 3 overlap each other in the height direction. In addition, the bonding tool 8 is located above the bonding target members 2 and 3 in the height direction. As shown in FIG. 6, in the central processor 31, the amplitude A0 of a strongly-bonded product, the first specified value A1, and the second specified value A2 are, for example, set based on an instruction input via the host device 35 shown in FIG. 3 (S101). In one example, an instruction may be input to the central processor 31 via a user interface provided in the host device 35.

The central processor 31 sets an initial value Fsi of a target value (control target value) Fs of pressurizing force, an initial value Bsi of a target value (control target-value) Bs of amplitude of ultrasonic vibration in the first direction, and an initial value Tsi of a target value (control target value) Ts of a time for oscillating ultrasonic waves (S102). The pressurizing force for which the target value Fs is set, ultrasonic vibration amplitude in the first direction for which the target value Bs is set, and an oscillating time for which the target value Ts is set are control parameters associated with the driving of the bonding tool 8. The central processor 31 adjusts oscillation of the ultrasonic oscillator 5 in cooperation with the ultrasonic oscillation controller 33 such that the amplitude B(t) of ultrasonic vibration in the first direction coincides or approximately coincides with the target value Bs of amplitude. Further, the central processor 31 adjusts pressurization of the pressurization mechanism 9 in cooperation with the pressure controller 32 such that the pressurizing force F(t) coincides or approximately coincides with the target value Fs of pressurizing force. In one example, the initial value Fsi of the target value Fs of pressurizing force is 500 N, the initial value Bsi of the target value Bs of amplitude is 10 μm, and the initial value Tsi of the target value Ts of time is 0.5 seconds. The initial value Fsi of Fs, the initial value Bsi of Bs, and the initial value Tsi of Ts are not limited thereto.

After settings of the amplitude A0 of vibration along the height direction of a strongly-bonded product, the first specified value A1, the second specified value A2, and the target values Fs, Bs, and Ts of control parameters are completed, the central processor 31 controls the pressure controller 32 to start pressurization of the bonding target members 2 and 3 by the pressurization mechanism 9 (S103). When the pressurization mechanism 9 pressurizes the bonding target members 2 and 3, the pressurizing force F(t) fluctuates. As shown in FIG. 6, the central processor 31 compares the pressurizing force F(t) with the initial value Fsi of the target value Fs of pressurizing force (S104). If the pressurizing force F(t) is the initial value Fsi of the target value Fs of pressurizing force or less (S104—No), the process returns to S104, and the processes in S104 and subsequent steps are sequentially performed. If the pressurizing force F(t) is greater than the initial value Fsi of the target value Fs (S104—Yes), the central processor 31 starts oscillation of ultrasonic waves from the ultrasonic oscillator 5 to the bonding target members 2 and 3 in cooperation with the ultrasonic oscillation controller 33 (S105).

Oscillation of ultrasonic waves by the ultrasonic oscillator 5 leads to fluctuations in the amplitude A(t) of vibration along the height direction. As shown in FIG. 6, the amplitude calculator 34 calculates the amplitude A(t) of vibration along the height direction detected by the sensor 11. The central processor 31 acquires the amplitude A(t) of vibration along the height direction from the amplitude calculator 34. The central processor 31 compares the amplitude A(t) of vibration along the height direction with the second specified value A2 (S107). If the amplitude A(t) of vibration along the height direction is greater than the second specified value A2 (S107—No), the central processor 31, for example, causes the user interface provided in the host device 35 to notify product failure (S108). Then, the central processor 31 ceases ultrasonic oscillation from the ultrasonic oscillator 5 in cooperation with the ultrasonic oscillation controller 33 (S112). The central processor 31 ceases pressurization of the bonding target members 2 and 3 by the pressurization mechanism 9 in cooperation with the pressure controller 32 (S113). That is, if the process proceeds to S107—No, the ultrasonic bonding apparatus 1 is ceased, and the driving of the bonding tool 8 is ceased accordingly. Then, ultrasonic bonding of the bonding target members 2 and 3 by the ultrasonic bonding apparatus 1 is terminated.

If the amplitude A(t) of vibration along the height direction is the second specified value A2 of amplitude or less (S107—Yes), the central processor 31 compares the amplitude A(t) of vibration along the height direction with the first specified value A1 (S109). If the amplitude A(t) of vibration along the height direction is greater than the first specified value A1 (S109—No), the central processor 31 changes at least one of the target values Fs, Bs, and Ts (S110). For example, the central processor 31 changes a value of the target value Fs. As described above, the central processor 31 adjusts oscillation of the ultrasonic oscillator 5 in cooperation with the ultrasonic oscillation controller 33 such that the pressurizing force F(t) coincides or approximately coincides with the target value Fs. Thus, when the target value Fs is changed, a value of the pressurizing force F(t) is changed.

The case where Fs is changed is identical that where Bs and Ts are changed. A degree of change for each of the target values Fs, Bs, and Ts is appropriately set according to a combination of the bonding target members 2 and 3, etc. After the process in S110, the process proceeds to S111.

If the amplitude A(t) of vibration along the height direction is the first specified value A1 or less (S109—Yes), the process proceeds to S111 without performing the process in S110. In S111, the central processor 31 compares the time t with the target value Ts of time (S111). If the time t is the target value Ts of time or less (S111—No), the process returns to S106, and the processes in S106 and subsequent steps are sequentially performed. If the time t is longer than the target value Ts of time (S111—Yes), the central processor 31 ceases ultrasonic oscillation from the ultrasonic oscillator 5 in cooperation with the ultrasonic oscillation controller 33 (S112). The central processor 31 ceases pressurization of the bonding target members 2 and 3 by the pressurization mechanism 9 in cooperation with the pressure controller 32 (S113). That is, the driving of the bonding tool 8 is ceased. Thereby, ultrasonic bonding of the bonding target members 2 and 3 by the ultrasonic bonding apparatus 1 is completed.

In the ultrasonic bonding apparatus 1 according to the present embodiment, the sensor 11 detects vibration along the height direction of the bonding target members 2 and 3 vibrating by ultrasonic vibration. The control device 30 changes the control parameters (Fs, Bs, and Ts) based on information related to vibration along the height direction of the bonding target members 2 and 3 detected by the sensor 11. Thereby, even when the bonding target members 2 and 3 vibrate along the height direction, in the ultrasonic bonding apparatus 1, the control device 30 appropriately changes the control parameters. Thus, in the ultrasonic bonding apparatus 1, a decrease in the bonding strength of the bonding target members 2 and 3 in ultrasonic bonding is suppressed. That is, the bonding strength of the bonding target members 2 and 3 is maintained.

In the ultrasonic bonding apparatus 1 of the present embodiment, the control parameters include the target value Fs of pressurizing force, the target value Bs of amplitude of ultrasonic vibration in the first direction, and the target value Ts of time for oscillating ultrasonic vibration. If the amplitude A(t) of vibration along the height direction of the bonding target members 2 and 3 is greater than the first specified value A1, the control device 30 changes at least one of the control parameters. Thereby, even when the bonding target members 2 and 3 vibrate along the height direction, in the ultrasonic bonding apparatus 1, the control device 30 changes the control parameter more suitably. Thus, in the ultrasonic bonding apparatus 1, a decrease in the bonding strength of the bonding target members 2 and 3 in ultrasonic bonding is further suppressed. That is, the bonding strength of the bonding target members 2 and 3 is further maintained.

In the ultrasonic bonding apparatus 1 of the present embodiment, if the amplitude A(t) of vibration along the height direction of the bonding target members 2 and 3 is greater than the second specified value A2, the ultrasonic bonding apparatus 1 is ceased. Thereby, if the bonding target members 2 and 3 are not favorably satisfactorily bonded, ultrasonic bonding by the ultrasonic bonding apparatus 1 is discontinued. Thus, in the ultrasonic bonding apparatus 1, unnecessary ultrasonic bonding time can be shortened.

(Modification)

Figure 7:
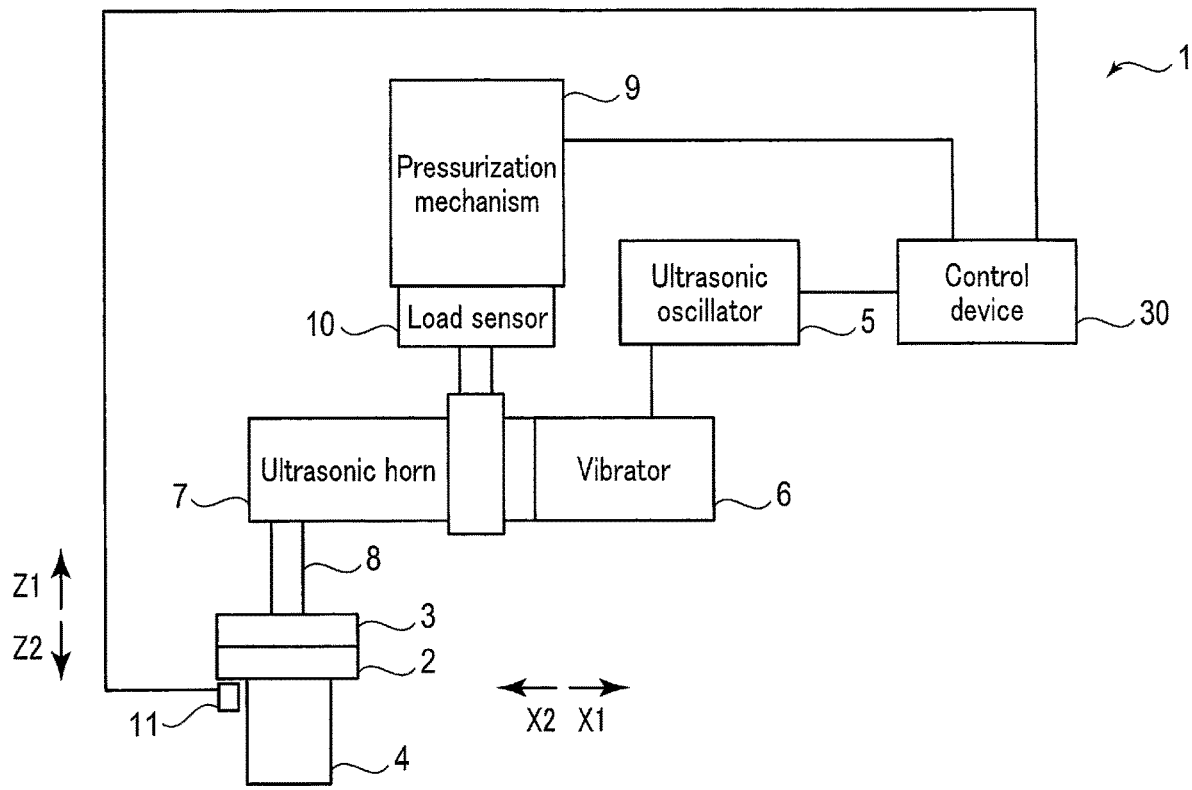
FIG. 7 is a schematic diagram showing a modification of the ultrasonic bonding apparatus according to the first embodiment.
Figure 8:
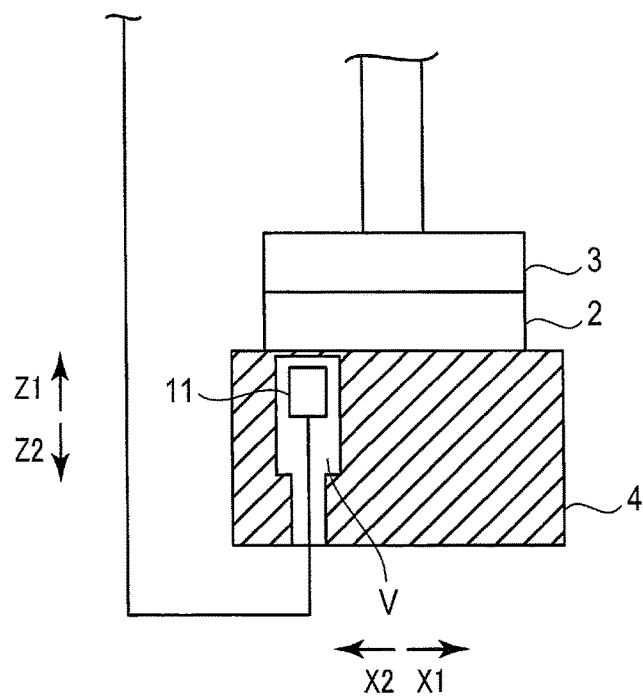
FIG. 8 is a schematic diagram showing another modification of the ultrasonic bonding apparatus according to the first embodiment, which is different from the modification in FIG. 7.
Figure 9:
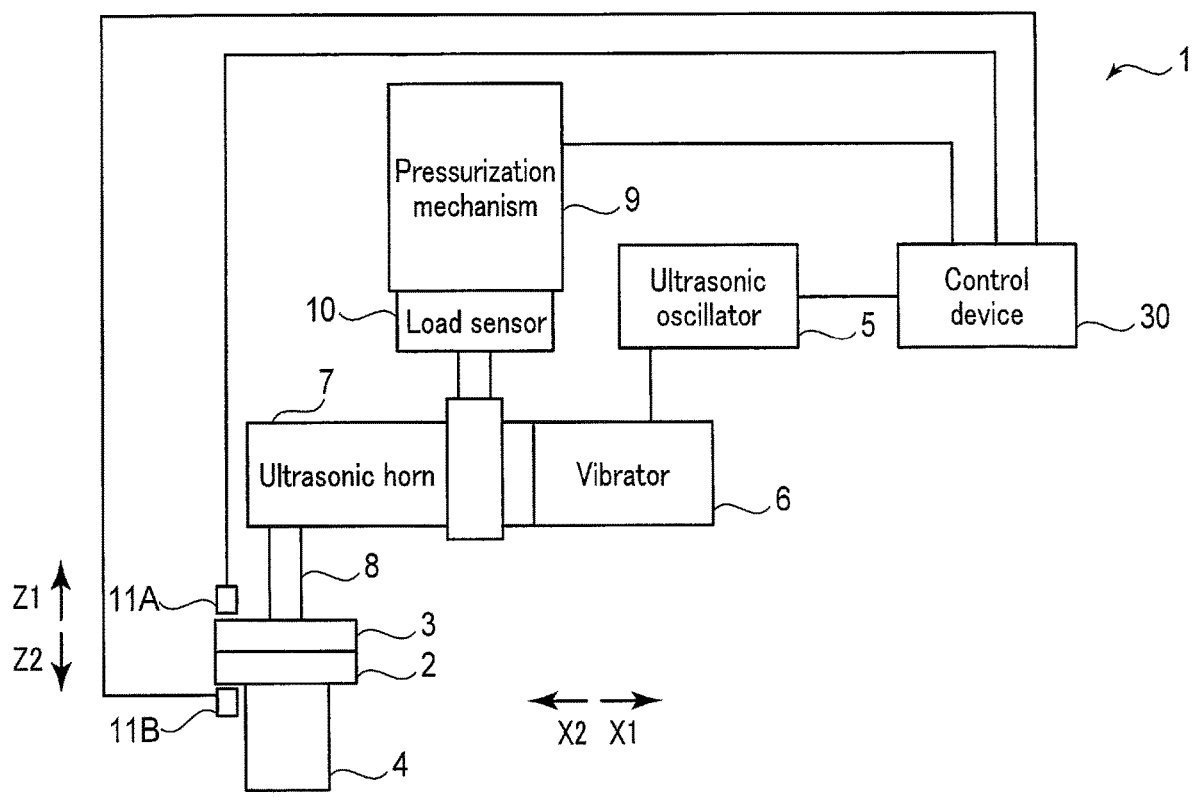
FIG. 9 is a schematic diagram showing an example of an ultrasonic bonding apparatus according to a second embodiment.

In a modification, as shown in FIG. 7, the sensor 11 may be provided under the bonding target members 2 and 3 in the height direction. In addition, as shown in FIG. 8, a cavity V may be formed inside the stage 4, and the sensor 11 may be arranged in the cavity V. In this case, the sensor 11 is preferably arranged at a portion close to the bonding target members 2 and 3 in the height direction on an inner surface of the cavity V. Also in the present modification, the same control as described above is performed in the ultrasonic bonding apparatus 1, and the same function and effect as those of the above-described embodiment, etc. are thus exhibited. In addition, the following function and effect are also exhibited. That is, with the configuration as described above in the present modification, for example, even if the arrangement of the sensor 11 is restricted due to limitations on the shape of the bonding target members 2 and 3, etc., the bonding target members 2 and 3 can be ultrasonically bonded as appropriate. Thus, in the ultrasonic bonding apparatus 1, the shape of the bonding target members 2 and 3 can be more freely selected.

Second Embodiment

A second embodiment has the same configuration as that of the first embodiment except that two sensors 11A and 11B are provided as the sensor 11 of the first embodiment. The sensor 11A is provided above the bonding target members 2 and 3 in the height direction. The sensor 11B is provided under the bonding target members 2 and 3 in the height direction. It is preferable that the positions of the sensors 11A and 11B are either not displaced or virtually undisplaced in the first direction and the second direction.

Corresponding threshold values (the first specified value and second specified value) are defined in each of the sensors 11A and 11B. The threshold values corresponding to each of the sensors 11A and 11B are appropriately set by a combination of the bonding target members 2 and 3, etc. Therefore, the first specified value for the sensor 11A and the first specified value for the sensor 11B may be the same or different. The second specified value for the sensor 11A and the second specified value for the sensor 11B may be the same or different. A method of setting the first specified value and the second specified value in the sensor 11A, and the first specified value and the second specified value in the sensor 11B is the same as that in the first embodiment. That is, they are set based on the amplitude A0 of a strongly-bonded product.

The control device 30 controls the ultrasonic bonding apparatus 1 based on the threshold values corresponding to each of the sensors 11A and 11B. In the present embodiment, in FIG. 6, the control device 30 performs the processes in S106, S107, and S109 based on measurement values of each of the sensors 11A and 11B. In one example, the amplitude calculator 34 calculates amplitude Aa(t) of vibration along the height direction based on the measurement values of the sensor 11A, and calculates amplitude Ab(t) of vibration along the height direction based on the measurement values of the sensor 11B. In S107, the central processor 31 compares the amplitude Aa(t) of vibration along the height direction and a second specified value A2a of the sensor 11A, as well as the amplitude Ab(t) of vibration along the height direction and a second specified value A2b of the sensor 11B. When Aa(t) is greater than A2a, or Ab(t) is greater than A2b, the central processor 31 proceeds with the processes in S108 and subsequent steps in the same manner as in the first embodiment, and ultrasonic bonding by the ultrasonic bonding apparatus 1 is ceased. When Aa(t) is A2a or less, and Ab(t) is A2b or less, the process proceeds to S109. In S109, the central processor 31 compares the amplitude Aa(t) of vibration along the height direction and a first specified value A1a of the sensor 11A, as well as the amplitude Ab(t) of vibration along the height direction and a first specified value A1b of the sensor 11B. When Aa(t) is greater than A1a, or Ab(t) is greater than A1b, the central processor 31 proceeds with the processes in S110 and subsequent steps. When Aa (t) is A1a or less, and Ab (t) is A1b or less, the central processor 31 proceeds with the processes in S111 and subsequent steps. The processing by the central processor 31 in the second embodiment is not limited to the above-described processing. That is, the processing by the central processor 31 may be performed based on measurement values of each of the sensors 11A and 11B.

In the present embodiment, the sensors 11A and 11B are provided on both sides of the bonding target members 2 and 3 in the height direction as described above. Thus, vibration along the height direction of the bonding target members 2 and 3 can be detected more precisely. Therefore, in the ultrasonic bonding apparatus 1, a decrease in the bonding strength of the bonding target members 2 and 3 in ultrasonic bonding is further suppressed. In addition, also in the present embodiment, since the configuration and processing are the same as those in the above-described embodiment, etc. except for the matters described above, the same function and effect as those in the above-described embodiment, etc. are exhibited.

In at least one of these embodiments, an ultrasonic bonding apparatus includes a stage, a bonding tool, a sensor, and a control device. On an upper side in a height direction of the stage, a bonding target member can be arranged. The bonding tool, arranged above the bonding target member in the height direction, through being driven in a state of using pressurizing force to press the bonding target member downward in the height direction while transmitting ultrasonic vibration which vibrates in a direction intersecting this height direction to the bonding target member, thereby bonds the bonding target member. The sensor detects vibration along the height direction in the bonding target member which vibrates by the ultrasonic vibration. The control device changes control parameters associated with the driving of the bonding tool based on information related to the vibration along the height direction detected by the sensor. Thereby, in the ultrasonic bonding apparatus 1, a decrease in the bonding strength of the bonding target members 2 and 3 in ultrasonic bonding is suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasonic bonding apparatus comprising:
   a stage where a bonding target member can be arranged on an upper side in a height direction, the height direction being perpendicular or approximately perpendicular to a bonded surface of the bonding target member;
   a bonding tool arranged above the bonding target member in the height direction, and configured to bond the bonding target member by being driven in a state of using pressurizing force to press the bonding target member downward in the height direction and transmitting ultrasonic vibration, which vibrates in a direction along the bonded surface, to the bonding target member;
   a sensor configured to detect vibration along the height direction in the bonding target member when the ultrasonic vibration vibrating in the direction along the bonded surface is transmitted to the bonding target member; and
   a control device configured to change a control parameter associated with driving of the bonding tool based on information related to the vibration along the height direction detected by the sensor.

2. The ultrasonic bonding apparatus according to claim 1, wherein
   the control device is configured to acquire, as the information related to the vibration along the height direction, amplitude of the vibration along the height direction,
   the control device is configured to use, as the control parameter, a target value for the pressurizing force, a target value for amplitude of the ultrasonic vibration, and a target value for a time for oscillating the ultrasonic vibration, and
   the control device is configured to change at least one of the control parameters when the amplitude of the vibration along the height direction is greater than a first specified value.

3. The ultrasonic bonding apparatus according to claim 2, wherein the control device is configured to ceases the driving of the bonding tool when the amplitude is greater than a second specified value.

4. A control device used together with a bonding tool configured to bond a bonding target member by being driven in a state of using pressurizing force to press the bonding target member downward in a height direction and transmitting ultrasonic vibration, which vibrates in a direction along a bonded surface of the bonding target member, to the bonding target member, the height direction being perpendicular or approximately perpendicular to the bonded surface, the control device comprising
   a processor configured to change a control parameter associated with the driving of the bonding tool based on information related to vibration along the height direction in the bonding target member, the vibration along the height direction being detected when the ultrasonic vibration vibrating in the direction along the bonded surface is transmitted to the bonding target member.

5. A control method comprising:
   bonding a bonding target member by driving a bonding tool in a state of using pressurizing force to press the bonding target member downward in a height direction and transmitting ultrasonic vibration, which vibrates in a direction along a bonded surface of the bonding target member, to the bonding target member, the height direction being perpendicular or approximately perpendicular to the bonded surface;
   detecting vibration along the height direction in the bonding target member when the ultrasonic vibration vibrating in the direction along the bonded surface is transmitted to the bonding target member; and
   changing a control parameter associated with the driving of the bonding tool based on information related to the detected vibration along the height direction of the bonding target member.

* * * * *